(12) United States Patent
Kawaoka et al.

(10) Patent No.: US 11,736,627 B2
(45) Date of Patent: Aug. 22, 2023

(54) SHEET CONVEYING DEVICE, IMAGE PROCESSING APPARATUS, AND SHEET CONVEYING METHOD

(71) Applicant: KYOCERA Document Solutions Inc., Osaka (JP)

(72) Inventors: Ryo Kawaoka, Osaka (JP); Tadaharu Kusumi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/655,528

(22) Filed: Mar. 18, 2022

(65) Prior Publication Data

US 2022/0311876 A1    Sep. 29, 2022

(30) Foreign Application Priority Data

Mar. 25, 2021  (JP) ................. 2021-051525

(51) Int. Cl.
*H04N 1/00* (2006.01)
*G03G 15/00* (2006.01)

(52) U.S. Cl.
CPC ..... *H04N 1/00082* (2013.01); *G03G 15/6529* (2013.01); *H04N 1/00037* (2013.01); *H04N 1/0057* (2013.01); *H04N 1/0062* (2013.01); *H04N 1/0066* (2013.01); *H04N 1/00631* (2013.01)

(58) Field of Classification Search
CPC .......... G03G 15/6529; H04N 1/00037; H04N 1/00082; H04N 1/0057; H04N 1/0062; H04N 1/00631; H04N 1/0066

USPC ........................................................ 358/498
See application file for complete search history.

(56) References Cited

U.S. PATENT DOCUMENTS

| 9,459,576 | B2 * | 10/2016 | Okuzono | G03G 21/06 |
| 2009/0166953 | A1 * | 7/2009 | Osakabe | B65H 7/02 |
|  |  |  |  | 271/18 |
| 2017/0160686 | A1 * | 6/2017 | Tanaka | H04N 1/00037 |
| 2020/0361730 | A1 * | 11/2020 | Kusumi | B65H 7/125 |
| 2021/0070564 | A1 * | 3/2021 | Ito | B65H 1/04 |
| 2022/0055851 | A1 * | 2/2022 | Ito | B65H 1/14 |
| 2022/0263961 | A1 * | 8/2022 | Tokoro | H04N 1/00602 |
| 2022/0299927 | A1 * | 9/2022 | Suese | G03G 15/6547 |
| 2022/0311874 | A1 * | 9/2022 | Kawaoka | G03G 15/607 |

(Continued)

FOREIGN PATENT DOCUMENTS

JP    2005015122 A    1/2005

*Primary Examiner* — Negussie Worku
(74) *Attorney, Agent, or Firm* — Alleman Hall Creasman & Tuttle LLP

(57) ABSTRACT

A sheet conveying device includes a sheet placement table, a sheet discharge table, a conveyance mechanism, raising/lowering mechanism, and a raising/lowering control portion. The sheet discharge table is located below the sheet placement table. The conveyance mechanism conveys a sheet placed on the sheet placement table onto the sheet discharge table via an execution position at which image processing is executed by an image processing portion. The raising/lowering mechanism raises and lowers the sheet placement table. The raising/lowering control portion controls the raising/lowering mechanism to lower the sheet placement table when a human detection sensor configured to detect a human in a detection region has detected a human in the detection region.

13 Claims, 6 Drawing Sheets

(56) References Cited

U.S. PATENT DOCUMENTS

2022/0321722 A1* 10/2022 Shirasaki ........... H04N 1/00602
2022/0331730 A1* 10/2022 Zhang .................... B01D 46/10

* cited by examiner

SHEET CONVEYING DEVICE, IMAGE PROCESSING APPARATUS, AND SHEET CONVEYING METHOD

INCORPORATION BY REFERENCE

This application is based upon and claims the benefit of priority from the corresponding Japanese Patent Application No. 2021-051525 filed on Mar. 25, 2021, the entire contents of which are incorporated herein by reference.

BACKGROUND

The present disclosure relates to a sheet conveying device, an image processing apparatus, and a sheet conveying method.

There is known, as a related technology, a sheet conveying device that includes a sheet placement table (sheet placement tray) and a sheet discharge table (sheet discharge tray), wherein a sheet (a bundle of document sheets) before image reading is placed on the sheet placement table, the sheet discharge table is disposed below the sheet placement table, and a sheet from which an image has been read is placed on the sheet discharge table. The sheet conveying device of the related technology includes a raising/lowering mechanism and a detection means, wherein the raising/lowering mechanism raises and lowers the sheet placement table so that a space between the sheet placement table and the sheet discharge table is widened, and the detection means detects whether or not a sheet is placed on the sheet discharge table. This sheet conveying device controls the raising/lowering operation of the sheet placement table based on the detection state of the detection means. In this sheet conveying device, when the detection means detects a sheet placed on the sheet placement table after a sheet reading operation is completed, the sheet placement table is raised, thereby enhancing visibility of the sheet on the sheet placement table and urging prevention of forgetting to take out the sheet from the sheet discharge table.

SUMMARY

A sheet conveying device according to an aspect of the present disclosure includes a sheet placement table, a sheet discharge table, a conveyance mechanism, raising/lowering mechanism, and a raising/lowering control portion. The sheet discharge table is located below the sheet placement table. The conveyance mechanism conveys a sheet placed on the sheet placement table onto the sheet discharge table via an execution position at which image processing is executed by an image processing portion. The raising/lowering mechanism raises and lowers the sheet placement table. The raising/lowering control portion controls the raising/lowering mechanism to lower the sheet placement table when a human detection sensor configured to detect a human in a detection region has detected a human in the detection region.

An image processing apparatus according to another aspect of the present disclosure includes the sheet conveying device and the image processing portion. The image processing portion executes at least one of image reading and image forming on the sheet as a target.

A sheet conveying method according to a further aspect of the present disclosure is used in a sheet conveying device that includes a sheet placement table, a sheet discharge table, a conveyance mechanism, raising/lowering mechanism, and a raising/lowering control portion. The sheet discharge table is located below the sheet placement table. The conveyance mechanism conveys a sheet placed on the sheet placement table onto the sheet discharge table via an execution position at which image processing is executed by an image processing portion. The raising/lowering mechanism raises and lowers the sheet placement table. The sheet conveying method includes controlling the raising/lowering mechanism to lower the sheet placement table when a human detection sensor configured to detect a human in a detection region has detected a human in the detection region.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings. It should be noted that the following embodiments are examples of specific embodiments of the present disclosure and should not limit the technical scope of the present disclosure.

Embodiment 1

[1] Entire Configuration of Image Processing Apparatus

Figure 1:
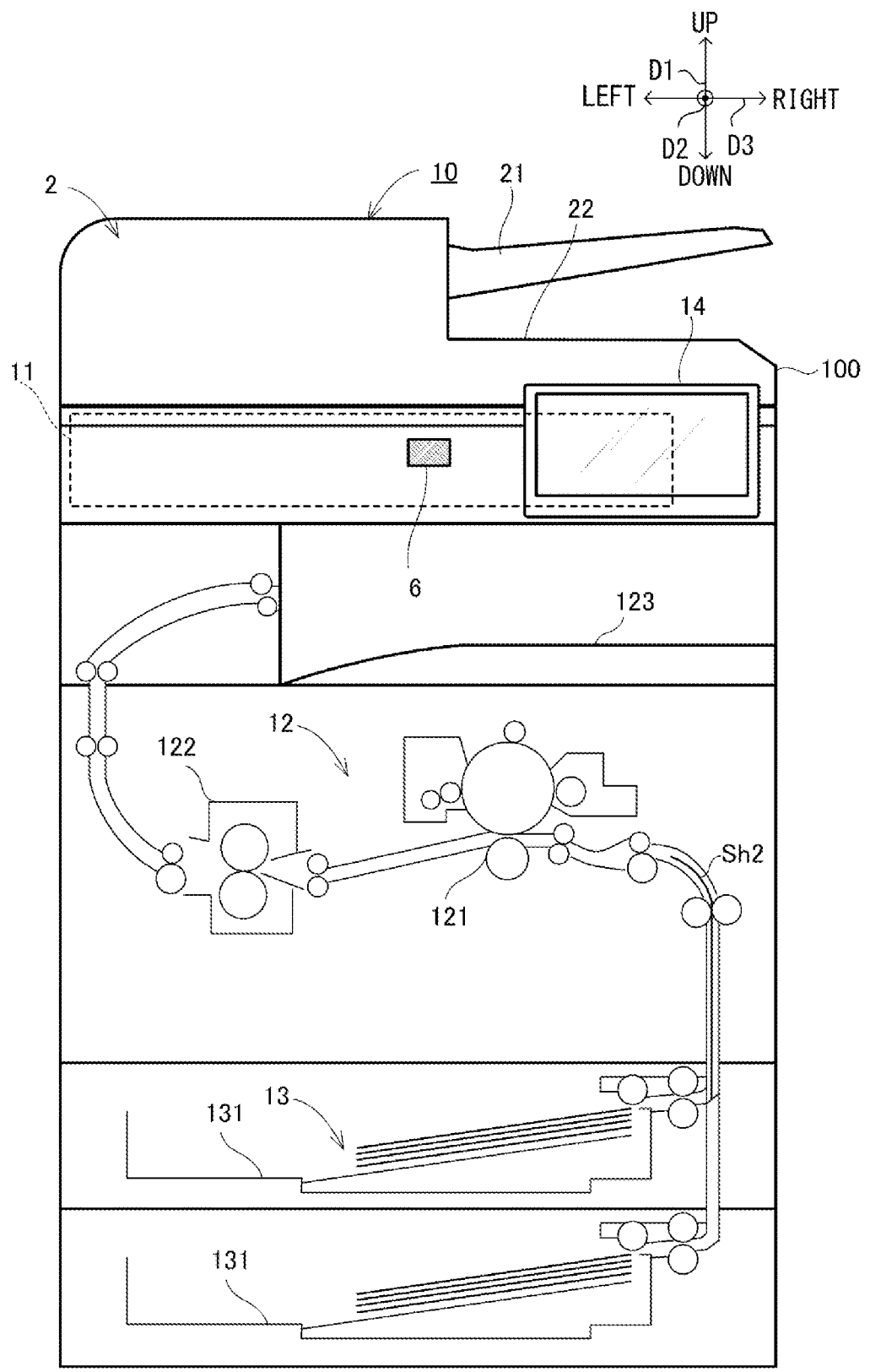
FIG. 1 is a schematic diagram showing an external appearance and an internal configuration of an image processing apparatus according to Embodiment 1.
Figure 2:
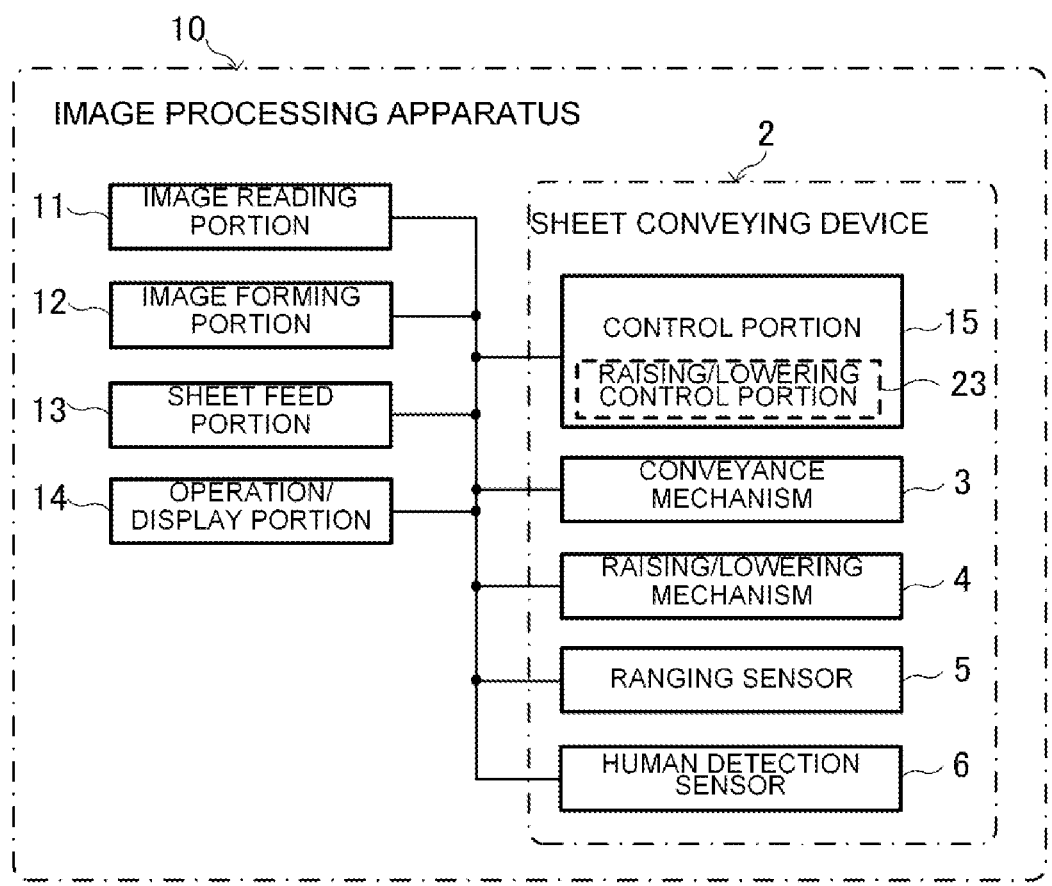
FIG. 2 is a schematic block diagram of the image processing apparatus according to Embodiment 1.

First, the following describes an entire configuration of an image processing apparatus 10 according to the present embodiment with reference to FIG. 1 and FIG. 2.

For the sake of explanation, a vertical direction in a state where the image processing apparatus 10 is usably installed (the state shown in FIG. 1), is defined as an up-down direction D1. In addition, a direction of the image processing apparatus 10 shown in FIG. 1 perpendicular to the paper surface is defined as a front-back direction D2, and a surface located on the front side in FIG. 1 is defined as a front surface. Furthermore, a left-right direction D3 is defined on the supposition that a surface on the left side in FIG. 1 is a left surface.

The image processing apparatus 10 according to the present embodiment is, for example, a multifunction peripheral having a plurality of functions such as a scan function to acquire an image (image data) from a document sheet, a print function to form an image based on image data, a facsimile function, and a copy function. The image processing apparatus 10 only needs to include an image processing function that includes at least one of a function to form an image and a function to read an image, and may be a printer, a scanner, a facsimile apparatus, or a copier.

As shown in FIG. 2, the image processing apparatus 10 includes a sheet conveying device 2, an image reading portion 11, an image forming portion 12, a sheet feed portion 13, an operation/display portion 14, and a control portion 15. In the present embodiment, as shown in FIG. 1, the image processing apparatus 10 includes a housing 100. The sheet conveying device 2, the image reading portion 11, the image forming portion 12, the sheet feed portion 13, the operation/display portion 14, and the control portion 15 are provided in the housing 100.

In the present embodiment, the sheet conveying device 2 is an auto document feeder (ADF). The sheet conveying device 2 conveys a sheet Sh1 (document sheet) as a reading target (image processing target) from which an image is read by the image reading portion 11. The sheet conveying device 2 includes a sheet placement table 21, a sheet discharge table 22, a conveyance mechanism 3, a raising/lowering mechanism 4, a ranging sensor 5, and a human detection sensor 6. The sheet conveying device 2 drives the conveyance mechanism 3 so that a sheet Sh1 set on the sheet placement table 21 is conveyed to the sheet discharge table 22 by passing an image reading position at which the image reading portion 11 reads an image from the sheet Sh1.

The image reading portion 11 reads an image from the sheet Sh1 (document sheet) and outputs image data corresponding to the read image. The image reading portion 11 includes a document sheet table, a light source, a plurality of mirrors, an optical lens, and a CCD (Charge Coupled Device).

The image forming portion 12 forms an image on a sheet Sh2 based on the image data output from the image reading portion 11. In addition, the image forming portion 12 forms an image on a sheet Sh2 based on image data input from an information processing apparatus, such as a personal computer, that is external to the image processing apparatus 10. In the present embodiment, as one example, as shown in FIG. 1, the image forming portion 12 includes a transfer device 121, a fixing device 122, and a sheet discharge tray 123, and forms an image on the sheet Sh2 by an electrophotographic method. Not limited to a configuration to form a monochrome image, the image forming portion 12 may have a configuration to form a full-color image by using four colors: C (cyan), M (magenta), Y (yellow), and K (black). In addition, the image forming portion 12 may have a configuration to form an image on a sheet by an image forming method, such as an ink jet method, other than the electrophotographic method.

The image forming portion 12 forms an image on a sheet Sh2 by using toner as developer. Specifically, the image forming portion 12 irradiates a laser light on an electrically charged surface of a photoconductor drum to form an electrostatic latent image thereon, and forms a toner image on the surface of the photoconductor drum by developing the electrostatic latent image by the toner. The transfer device 121 transfers the toner image to a sheet Sh2 while it is conveyed along a conveyance path. The fixing device 122 fixes the toner image that has been transferred to a sheet Sh2, to the sheet Sh2 by melting. For example, the fixing device 122 includes a fixing roller and a pressing roller, and fixes the toner image to the sheet Sh2 by heating the toner image that has been transferred to the sheet Sh2, while applying pressure to the sheet Sh2. The sheet Sh2 with the image formed thereon is discharged to the sheet discharge tray 123. In a case where the image forming portion 12 forms an image by the ink jet method, ink (another example of the developer) is supplied instead of the toner.

The sheet feed portion 13 supplies a sheet Sh2 to the image forming portion 12. The sheet feed portion 13 includes a plurality of sheet feed cassettes 131, a manual feed tray, and a plurality of conveyance rollers. The sheet feed portion 13 feeds a sheet Sh2 from the plurality of sheet feed cassettes 131 or the manual feed tray, and the sheet Sh2 is conveyed along a conveyance path by the plurality of conveyance rollers to be supplied to the image forming portion 12. The image forming portion 12 forms an image on the sheet Sh2 supplied from the sheet feed portion 13 along the conveyance path.

The operation/display portion 14 is a user interface in the image processing apparatus 10. The operation/display portion 14 includes a display portion and an operation portion, wherein the display portion is, for example, a liquid crystal display that displays various types of information in accordance with a control instruction from the control portion 15, and the operation portion is, for example, a switch or a touch panel that inputs various types of information to the control portion 15 in accordance with a user operation. In addition, the image processing apparatus 10 may include, as user interfaces, an audio output portion and an audio input portion for example in addition to or in place of the operation/display portion 14. In addition, the operation/display portion 14 may be, for example, an external device that is provided independently of the housing 100. In this case, the image processing apparatus 10 can use the operation/display portion 14 as a user interface by performing a data communication with the external device.

The control portion 15 comprehensively controls the image processing apparatus 10. A main configuration of the control portion 15 is a computer system that includes one or more processors and one or more memories. In the image processing apparatus 10, the functions of the control portion 15 are realized when the one or more processors execute programs. The programs may be preliminarily recorded on the one or more memories, may be provided via an electric communication line such as the Internet, or may be provided in a state of being recorded on a non-transitory recording medium, such as a memory card or an optical disc, that can be read by a computer system. The one or more processors are composed of one or more electronic circuits including a semiconductor integrated circuit. Furthermore, the computer system referred to in the present disclosure includes a micro controller that includes one or more processors and one or more memories. The control portion 15 may be a control portion that is provided independently of a main control portion that comprehensively controls the image processing apparatus 10.

In addition, the image processing apparatus 10 further includes a storage portion, a communication portion, and a power source portion. The storage portion includes one or more nonvolatile memories, and preliminarily stores information, such as control programs, for causing the control portion 15 to execute various types of processing. The communication portion is an interface configured to execute a data communication between the image processing apparatus 10 and, for example, an external apparatus that is connected therewith via a communication network such as the Internet or a LAN (Local Area Network). The power source portion is a power source circuit configured to generate (output) an electric power for operating the image processing apparatus 10.

Here, the sheet conveying device 2 of the present embodiment constitutes the image processing apparatus 10 together with an image processing portion (the image reading portion 11 and the image forming portion 12). In other words, the sheet conveying device 2 of the present embodiment includes the sheet conveying device 2 and an image processing portion that executes at least one of image reading and image forming on the sheet Sh1 as a target.

[2] Sheet Conveying Device

Next, the following describes a configuration of the sheet conveying device 2 according to the present embodiment in more detail with reference to FIG. 1 to FIG. 5.

The sheet conveying device 2 is configured to convey a sheet Sh1 from the sheet placement table 21 to the sheet discharge table 22. Here, the "sheet" of the present disclosure is a target of image reading or a target of image forming. As one example, in the present embodiment, a sheet Sh1 as a target of conveyance by the sheet conveying device 2 is a sheet Sh1 (document sheet) as a target of image reading by the image reading portion 11. That is, in the present embodiment, the sheet conveying device 2 conveys a sheet Sh1 placed on the sheet placement table 21 onto the sheet discharge table 22 via an execution position P1 (see FIG. 3) at which image processing (image reading) is executed by the image reading portion 11 as an image processing portion. Accordingly, the position at which the image is read by the image reading portion 11 corresponds to the execution position P1. In addition, in the present embodiment, the sheet Sh1 is paper as one example. However, the sheet Sh1 is not limited to paper, but may be, for example, a resin film.

In the present embodiment, in addition to the sheet placement table 21, the sheet discharge table 22, the conveyance mechanism 3, the raising/lowering mechanism 4, the ranging sensor 5, and the human detection sensor 6, the sheet conveying device 2 includes a raising/lowering control portion 23. The raising/lowering control portion 23 is provided in the control portion 15 as a function of the control portion 15. That is, in the present embodiment, the image processing apparatus 10 is provided with the raising/lowering control portion 23 included in the sheet conveying device 2, as a function of the control portion 15.

The sheet placement table 21 is a member on which a sheet Sh1 as a target of conveyance by the sheet conveying device 2 is placed. In the present embodiment, a sheet Sh1 conveyed by the sheet conveying device 2 is a sheet Sh1 (document sheet) as a target of image reading by the image reading portion 11. As a result, a sheet Sh1 set on an upper surface of the sheet placement table 21 is a sheet Sh1 before image reading by the image reading portion 11.

Here, sheets Sh1 of various sizes (paper sizes), such as A3E (A3 lateral size), B4E (B4 lateral size), 2L print size, L print size, postcard, or business card, can be set on the sheet placement table 21. The sheet placement table 21 includes a pair of cursors that face each other in the front-back direction D2, and the distance between the pair of cursors is adjusted in accordance with a size of the sheet Sh1 set on the sheet placement table 21 in a lateral direction (in this case, the front-back direction D2) that is perpendicular to a longitudinal direction (conveyance direction) of the sheet Sh1.

One or more sheets Sh1, as a target of conveyance by the sheet conveying device 2, are set on the sheet placement table 21 in a state of being placed thereon. When a plurality of sheets Sh1 are set on the sheet placement table 21, the plurality of sheets Sh1 are placed on the sheet placement table 21 in a state of being overlaid in the up-down direction D1, namely, in a state of being stacked.

The sheet discharge table 22 is a member on which a sheet Sh1 that has been conveyed by the sheet conveying device 2 is placed. The sheet discharge table 22 is located below the sheet placement table 21. The sheet conveying device 2 conveys a sheet Sh1 placed on the sheet placement table 21 to pass the execution position P1 at which the image processing is executed by the image processing portion, and discharges the sheet Sh1 onto the sheet discharge table 22. In the present embodiment, since a sheet Sh1 conveyed by the sheet conveying device 2 is a sheet Sh1 (document sheet) as a target of image reading by the image reading portion 11, a sheet Sh1 from which an image has been read by the image reading portion 11 is discharged onto an upper surface of the sheet discharge table 22.

Here, as is the case with the sheet placement table 21, sheets Sh1 of various sizes (paper sizes) can be placed on the sheet discharge table 22. Furthermore, as is the case with the sheet placement table 21, when a plurality of sheets Sh1 are discharged onto the sheet discharge table 22, the plurality of sheets Sh1 are placed on the sheet discharge table 22 in a state of being overlaid in the up-down direction D1, namely, in a state of being stacked.

Figure 3:
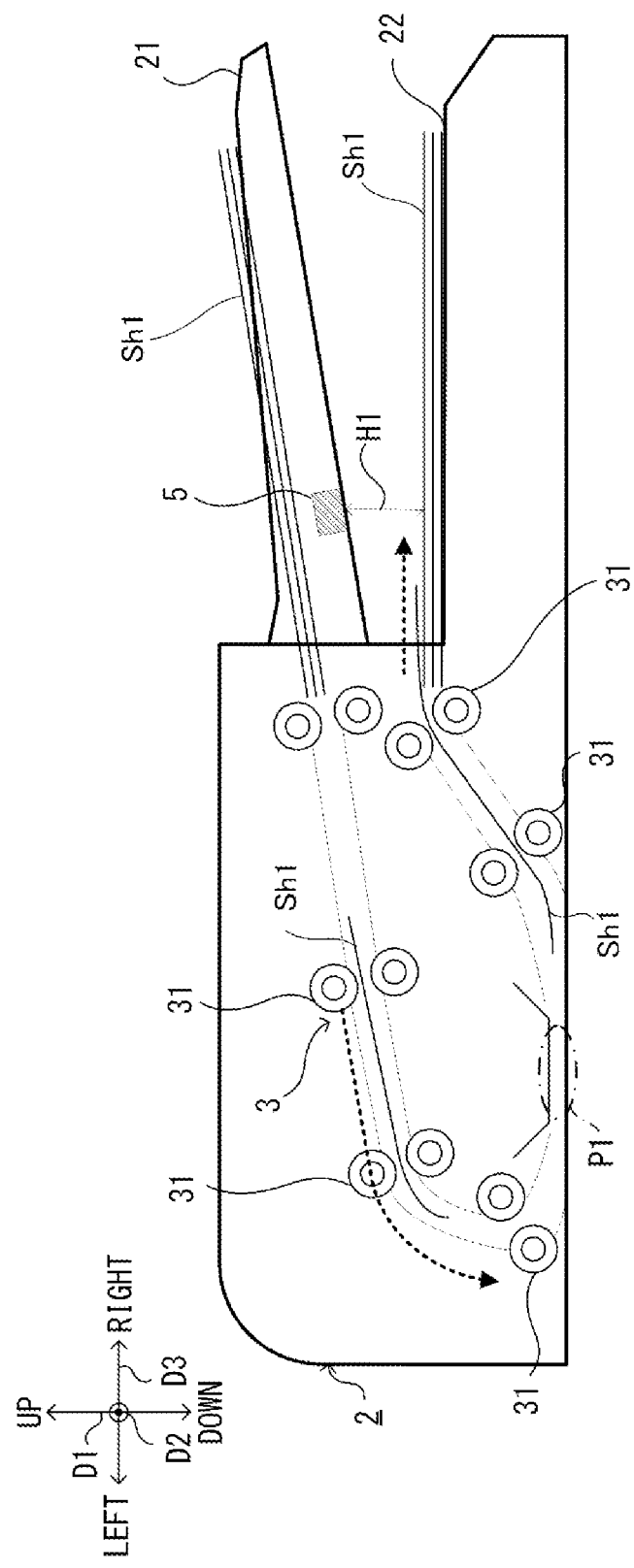
FIG. 3 is a schematic diagram showing an external appearance and an internal configuration of a sheet conveying device according to Embodiment 1.

As shown in FIG. 3, the conveyance mechanism 3 conveys a sheet Sh1 placed on the sheet placement table 21 onto the sheet discharge table 22 via the execution position P1. That is, the conveyance mechanism 3 conveys the sheet Sh1 from the sheet placement table 21 leftward and then downward as indicated by the dotted arrow in FIG. 3, turns back the sheet Sh1 to the right to pass through the execution position P1, and then discharges the sheet Sh1 onto the sheet discharge table 22. In other words, a conveyance path along which the sheet Sh1 is conveyed by the conveyance mechanism 3 includes the execution position P1 at which image processing by the image processing portion (in the present embodiment, image reading by the image reading portion 11) is executed.

For example, the conveyance mechanism 3 includes a plurality of conveyance rollers 31 and a power source. The conveyance mechanism 3 conveys sheets Sh1 set on the sheet placement table 21 one by one to the sheet discharge table 22 via the execution position P1 by driving the plurality of conveyance rollers 31 by the power of the power source that includes, for example, a motor. For example, in a state where a predetermined number of sheets Sh1 are set on the sheet placement table 21, the conveyance mechanism 3 conveys the predetermined number of sheets Sh1 one by one until all of the predetermined number of sheets Sh1 are discharged onto the sheet discharge table 22. This allows the predetermined number of sheets Sh1 as a job target to be moved from on the sheet placement table 21 onto the sheet discharge table 22 that is located below the sheet placement table 21.

The raising/lowering mechanism 4 is configured to raise and lower the sheet placement table 21. That is, the sheet placement table 21 is configured to be moved in the up-down direction D1 at least within a predetermined raising/lowering range. Specifically, the raising/lowering mechanism 4 is configured to switchably execute a raising operation and a lowering operation, wherein with the raising operation, the raising/lowering mechanism 4 moves up the sheet placement table 21 relative to the housing 100, and with the lowering operation, the raising/lowering mechanism 4 moves down the sheet placement table 21 relative to the housing 100. Furthermore, in a state of executing neither the raising operation nor the lowering operation, the raising/lowering mechanism 4 supports the sheet placement table 21 at an arbitrary position within the raising/lowering range.

In the present embodiment, an initial position is defined between an upper limit position (top dead center) and a lower limit position (bottom dead center) of the raising/lowering range, and at a normal time including a non-operation time of the image processing apparatus 10, the raising/lowering mechanism 4 supports the sheet placement table 21 at the initial position. Furthermore, the raising/lowering mechanism 4 is configured to move the sheet placement table 21 in a stepless manner in the up-down direction D1, and stop the sheet placement table 21 at an arbitrary position in the raising/lowering range. As a result, when the raising/lowering mechanism 4 performs a raising operation, it is possible to move the sheet placement table 21 from the initial position to an arbitrary position between the initial position and the upper limit position of the raising/lowering range. Conversely, when the raising/lowering mechanism 4 performs a lowering operation, it is possible to move the sheet placement table 21 from the initial position to an arbitrary position between the initial position and the lower limit position of the raising/lowering range.

Specifically, the raising/lowering mechanism 4 includes, for example: a mechanism portion such as a ball screw, a rack-pinion, and a pantograph; and a power source. The raising/lowering mechanism 4 moves the sheet placement table 21 straight along the up-down direction D1 by driving the mechanism portion by the power of the power source that includes, for example, a motor. Here, the raising/lowering mechanism 4 preferably has a sensor such as an encoder in the mechanism portion or the power source so as to have a function to detect the current position of the sheet placement table 21. This allows the raising/lowering mechanism 4 to raise and lower the sheet placement table 21 only within the raising/lowering range, and return it to the initial position. Furthermore, the raising/lowering mechanism 4 preferably has a function to detect a load applied to the output of the power source. With such a function, the raising/lowering mechanism 4 can stop or reversely move the sheet placement table 21 when, for example, a foreign matter (for example, a part of the body of a user) is caught during raising or lowering of the sheet placement table 21, and an overload acts.

It noted here that the raising/lowering mechanism 4 only needs to have a function to raise and lower the sheet placement table 21, and the above-described detailed configurations of the raising/lowering mechanism 4 are optional to the sheet conveying device 2. For example, moving the sheet placement table 21 in a stepless manner is not indispensable, but the sheet placement table 21 may be moved in a stepwise manner. In addition, defining the initial position within the raising/lowering range is not indispensable, but the raising/lowering mechanism 4 may always support the sheet placement table 21 at an arbitrary position. Furthermore, not limited to the configuration to move the sheet placement table 21 straight along the up-down direction D1, the raising/lowering mechanism 4 may, for example, raise and lower the sheet placement table 21 by rotating the sheet placement table 21 with an end (left end) of the sheet placement table 21 in the left-right direction D3 as a fulcrum.

As shown in FIG. 3, the ranging sensor 5 measures a height H1 that is a height from the sheet Sh1 on the sheet discharge table 22 to the sheet placement table 21. The ranging sensor 5 outputs the measurement result, namely, an electric signal corresponding to the height H1, to the control portion 15. The ranging sensor 5 is disposed on the lower surface side of the sheet placement table 21, and measures the height H1 that is a height from an upper surface of the sheet Sh1 discharged on the sheet discharge table 22 to a lower surface of the sheet placement table 21. That is, the height H1 measured by the ranging sensor 5 corresponds to a size of a gap between the lower surface of the sheet placement table 21 and the upper surface of the sheet Sh1. The larger the number of sheets Sh1 discharged onto the sheet discharge table 22 is, and for the same number of sheets Sh1, the larger the thickness of each sheet Sh1 is, the smaller (lower) the height H1 is, when the sheet placement table 21 is located at the same position. The ranging sensor 5 is, for example, a contactless sensor that uses reflection of light or ultrasonic waves.

Figure 4:
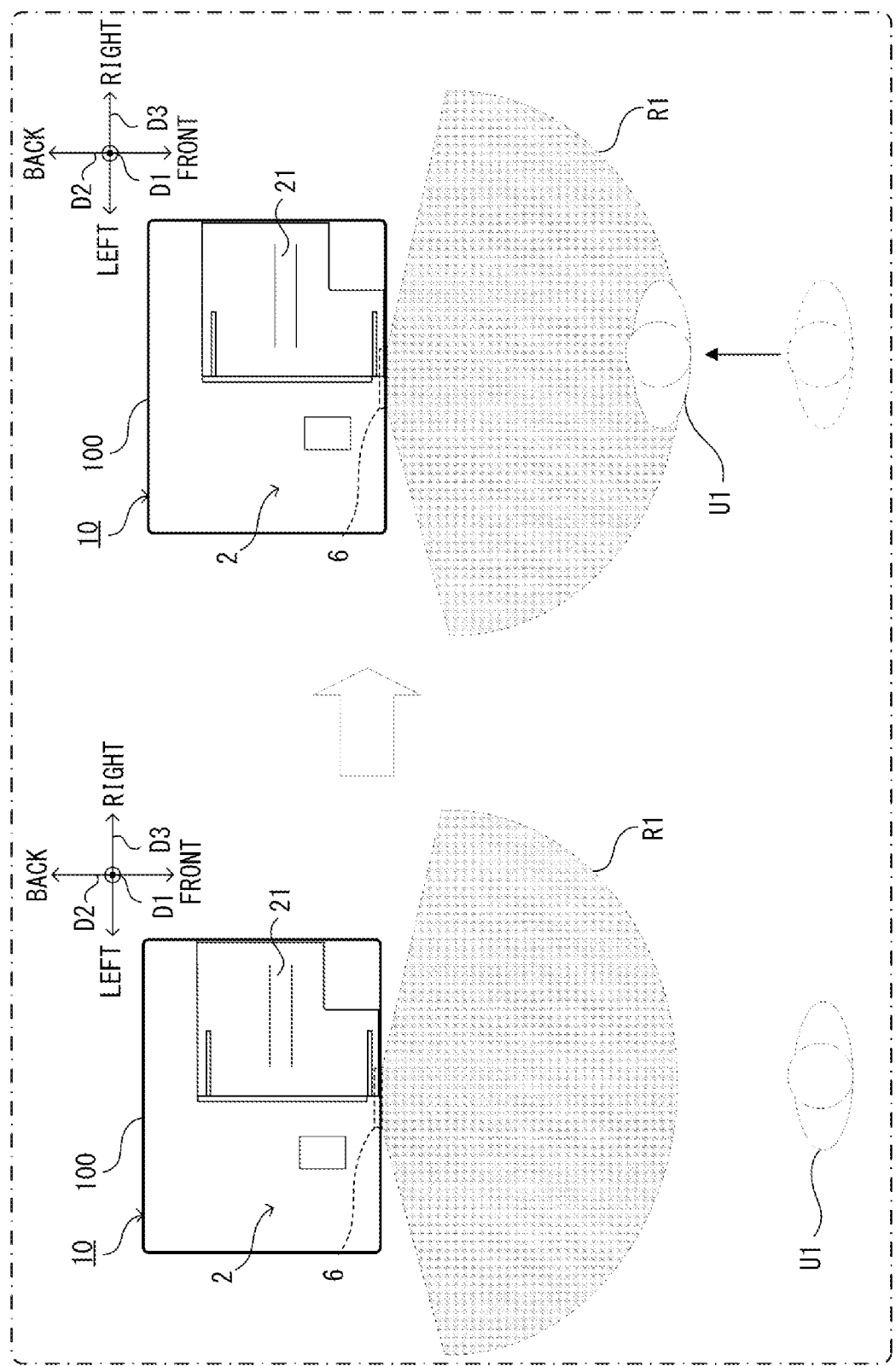
FIG. 4 is a diagram showing an example of a detection region of a human detection sensor used in the sheet conveying device according to Embodiment 1.

The human detection sensor 6 is configured to detect a human U1 (see FIG. 4) in a detection region R1 (see FIG. 4). The human detection sensor 6 outputs the measurement result, namely, an electric signal indicating whether or not a human U1 is present in the detection region R1, to the control portion 15. For example, as shown in FIG. 1, the human detection sensor 6 is disposed on the front side of the housing 100 of the image processing apparatus 10, and detects a human U1 in the detection region R1 that is set in the front (front side) of the housing 100 in the vicinity of the housing 100. Here, the "detection region" is a target of detection of the presence of the human U1 by the human detection sensor 6. As one example, as shown in FIG. 4, the "detection region" is a three dimensional region set in front of the housing 100 of the image processing apparatus 10, and has an approximate fan shape in a plan view and a predetermined shape in a side view. Not limited to the shape shown in FIG. 4, an arbitrary shape may be adopted as the shape of the detection region R1. Furthermore, the shape of the detection region R1 may be variable. For example, the human detection sensor 6 is a human sensor including a pyroelectric infrared sensor or an image sensor.

Meanwhile, there is known, as a technology related to the sheet conveying device 2 of this type, a sheet conveying device that includes a sheet placement table and a sheet discharge table, wherein a sheet before image reading is placed on the sheet placement table, the sheet discharge table is disposed below the sheet placement table, and a sheet from which an image has been read is placed on the sheet discharge table. The sheet conveying device of the related technology includes a raising/lowering mechanism and a detection means, wherein the raising/lowering mechanism raises and lowers the sheet placement table so that a space between the sheet placement table and the sheet discharge table is widened, and the detection means detects whether or not a sheet is placed on the sheet discharge table. This sheet conveying device controls the raising/lowering operation of the sheet placement table based on the detection state of the detection means. In this sheet conveying device, when the detection means detects a sheet placed on the sheet placement table after a sheet reading operation is completed, the sheet placement table is raised, thereby enhancing visibility of the sheet on the sheet placement table and urging prevention of forgetting to take out the sheet from the sheet discharge table.

However, according to the configuration of the related technology, the sheet placement table is raised each time a sheet reading operation is completed. As a result, for example, when the sheet reading operation is newly performed, first the sheet placement table needs to be lowered to return to the initial position, causing the user to wait until the sheet placement table returns to the initial position. This may be an inconvenience for the user when the user wants to perform the image processing (image reading) immediately.

On the other hand, the present embodiment provides the sheet conveying device 2 and the image processing apparatus 10 that improve the convenience with the configuration described in the following.

That is, the sheet conveying device 2 according to the present embodiment includes the sheet placement table 21, the sheet discharge table 22, the conveyance mechanism 3, the raising/lowering mechanism 4, and the raising/lowering control portion 23. The sheet discharge table 22 is located below the sheet placement table 21. The conveyance mechanism 3 conveys a sheet Sh1 placed on the sheet placement table 21 onto the sheet discharge table 22 via the execution position P1 at which the image processing is executed by the image processing portion. The raising/lowering mechanism 4 raises and lowers the sheet placement table 21. The raising/lowering control portion 23 controls the raising/lowering mechanism 4 to lower the sheet placement table 21 when the human detection sensor 6 has detected a human U1 in the detection region R1. In the present embodiment, the raising/lowering control portion 23 that is a component of the sheet conveying device 2 is provided in the control portion 15 as a function of the control portion 15.

With the above-described configuration, the sheet conveying device 2 according to the present embodiment and the image processing apparatus 10 including the sheet conveying device 2 have an advantage of being able to improve the convenience. That is, the raising/lowering control portion 23 controls the raising/lowering mechanism 4 such that the sheet placement table 21 is lowered upon detection of the presence of the human U1 in the detection region R1. Accordingly, when the image processing (image reading) of a sheet Sh1 is completed, and the image processing (image reading) is performed on a new sheet Sh1, it is possible to lower the sheet placement table 21 before the user (human U1) operates the image processing apparatus 10. That is, the raising/lowering control portion 23 is configured to lower the sheet placement table 21 at a timing when the user (human U1) who has approached the image processing apparatus 10 to perform the image processing (image reading) of the new sheet Sh1, enters the detection region R1. This improves the convenience of the user (human U1) because the user can perform the image processing (image reading) of the new sheet Sh1 relatively soon without waiting for the sheet placement table 21 to return to the initial position (or with reduced waiting time).

In short, in the present embodiment, the raising/lowering control portion 23 controls the raising/lowering mechanism 4 based on the detection result of the human detection sensor 6 that is configured to detect the human U1 in the detection region R1, and the raising/lowering control portion 23 automatically lowers the sheet placement table 21 upon detection of the human U1 by the human detection sensor 6. That is, as shown in the left side of FIG. 4, in a state where the human U1 is not present in the detection region R1 that is set in the vicinity of the housing 100 of the image processing apparatus 10, the raising/lowering control portion 23 does not start to lower the sheet placement table 21. Following this state, for example, when the human U1 approaches the image processing apparatus 10 to newly perform the image processing (image reading) on a sheet Sh1, and enters the detection region R1 as shown in the right side of FIG. 4, the raising/lowering control portion 23 starts to lower the sheet placement table 21. As described above, the raising/lowering control portion 23 automatically starts to lower the sheet placement table 21 upon detection of the human U1 in the detection region R1.

It noted here that the raising/lowering control portion 23 only needs to control the raising/lowering mechanism 4 based on an output (detection result) of the human detection sensor 6, and it is not indispensable that the human detection sensor 6 is a component of the sheet conveying device 2. For example, the raising/lowering control portion 23 may control the raising/lowering mechanism 4 based on an output of the human detection sensor 6 that is an external device provided independent of the sheet conveying device 2.

In addition, in the present embodiment, when the sheet placement table 21 moves down to a specific position, the raising/lowering control portion 23 stops lowering the sheet placement table 21. The "specific position" mentioned here is a specific position within the raising/lowering range of the sheet placement table 21, and is, for example, a position where a gap that is enough for the user to remove the sheet Sh1 from on the sheet discharge table 22 is formed under the sheet placement table 21. That is, when the sheet placement table 21 is excessively lowered, the gap between the lower surface of the sheet placement table 21 and the sheet Sh1 on the sheet discharge table 22 becomes too narrow for the user to insert his/her hand into the gap to remove the sheet Sh1 from on the sheet discharge table 22. Accordingly, the raising/lowering control portion 23 is configured to stop lowering the sheet placement table 21, for example, at such a specific position to facilitate the user to remove the sheet Sh1 from on the sheet discharge table 22. With this configuration, even when the human U1 detected by the human detection sensor 6 is a user who intends to remove the sheet Sh1 from on the sheet discharge table 22, the work for removing the sheet Sh1 is hardly inhibited. As a result, for the user who approaches the image processing apparatus 10 to remove the sheet Sh1 from on the sheet discharge table 22, the work for removing the sheet Sh1 is not inhibited, and the usability is secured.

Furthermore, in the present embodiment, the specific position is a position where the height H1 that is a height from the sheet Sh1 on the sheet discharge table 22 to the sheet placement table 21, is equal to or lower than a set value. That is, the specific position at which the sheet placement table 21 stops being lowered by the raising/lowering control portion 23, is indicated by the position (height H1) of the sheet placement table 21 on the basis of the upper surface of the sheet Sh1 on the sheet discharge table 22. Specifically, the raising/lowering control portion 23 identifies the height H1 that is a height from the sheet Sh1 on the sheet discharge table 22 to the sheet placement table 21, based on an output of the ranging sensor 5. Subsequently, while the identified height H1 is higher than the set value, the raising/lowering control portion 23 controls the raising/lowering mechanism 4 to lower the sheet placement table 21, and when the identified height H1 becomes equal to or lower than the set value, the raising/lowering control portion 23 determines that the sheet placement table 21 has reached the specific position and controls the raising/lowering mechanism 4 to stop lowering the sheet placement table 21. The set value is set such that a gap that is enough for the user to insert his/her hand into the gap to remove the sheet Sh1 from on the sheet discharge table 22 is formed between the lower surface of the sheet placement table 21 and the sheet Sh1 on the sheet discharge table 22. For example, in a case where the set value is 30 mm, when the height H1 measured by the ranging sensor 5 is 50 mm, the raising/lowering control portion 23 moves down (lower) the sheet placement table 21 by 20 mm, and stops the raising/lowering mechanism 4 when the height H1 becomes the set value (30 mm).

Figure 5:
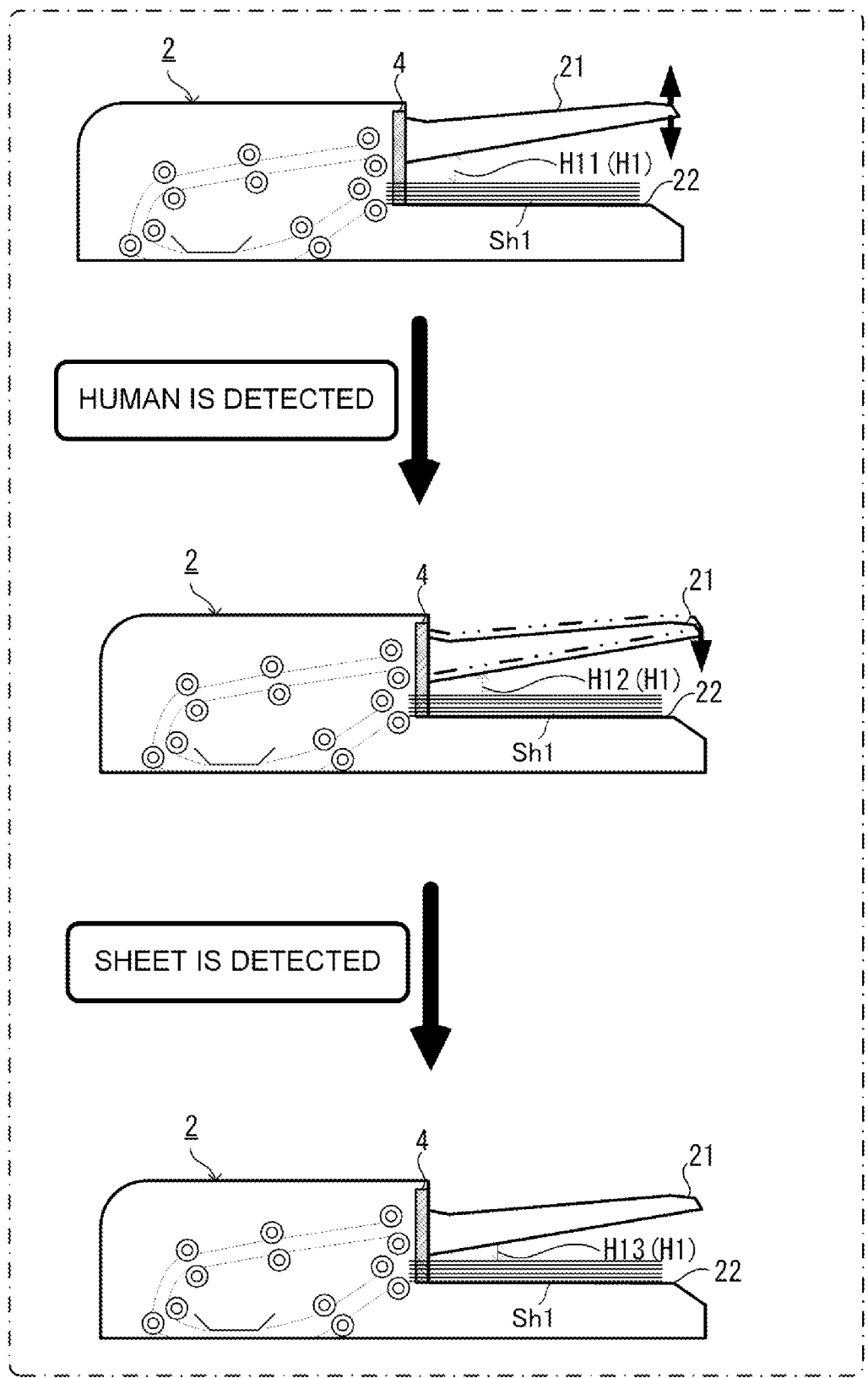
FIG. 5 is a schematic diagram showing an example of a lowering operation of the sheet conveying device according to Embodiment 1.

That is, in the sheet conveying device 2 according to the present embodiment, as shown in FIG. 5, when the human detection sensor 6 detects the human U1, the sheet placement table 21 starts to be lowered, and when the ranging sensor 5 detects the sheet Sh1 within the set value (when the height H1 measured by the ranging sensor 5 becomes equal to or lower than the set value), the lowering of the sheet placement table 21 is stopped. Accordingly, the height H1 that is a height from the sheet Sh1 on the sheet discharge table 22 to the sheet placement table 21, decreases from a height H11 before the human U1 is detected, to a height H12 after the human U1 is detected (H11>H12). Furthermore, a height H13 when the sheet placement table 21 is stopped upon detection of the sheet Sh1, corresponds to the set value and is smaller than the height H12 after the human U1 is detected (H12>H13).

With the above-described configuration, the position (specific position) at which the sheet placement table 21 is stopped from being lowered is not defined by an absolute position of the sheet placement table 21, but is defined by a relative height of the sheet placement table 21 from the sheet Sh1 on the sheet discharge table 22. Accordingly, it is possible to form, in a reliable manner between the lower surface of the sheet placement table 21 and the sheet Sh1 on the sheet discharge table 22, a gap that is enough for the user to insert his/her hand into the gap to remove the sheet Sh1 from on the sheet discharge table 22. This facilitates the user to remove the discharged sheet Sh1. It is noted here that the use of the ranging sensor 5 to detect the position (specific position) where the sheet placement table 21 is stopped from being lowered, is not indispensable. For example, the raising/lowering control portion 23 may detect the specific position based on an output of a sensor that is configured to output a detection signal upon detecting that the height H1 that is a height from the sheet Sh1 on the sheet discharge table 22 to the sheet placement table 21, has become equal to the set value.

In addition, in the present embodiment, the output of the human detection sensor 6 is used to control the operation of the image processing portion (for example, the image reading portion 11). As one example, the image processing apparatus 10 has, as operation modes of the total components including the image processing portion, a plurality of modes including a normal mode and a power saving mode (sleep mode) in which power consumption, such as standby power, is restricted to be relatively low. In the power saving mode, power consumption is low, but image processing portions, such as the image reading portion 11 and the image forming portion 12, do not operate. Here, the image processing apparatus 10 automatically changes from the normal mode to the power saving mode when no operation is performed on the image processing apparatus 10 for a predetermined time period, or when a predetermined operation is performed on the operation/display portion 14, thereby restricting the power consumption until the next use of the image processing apparatus 10.

In the present embodiment, the image processing apparatus 10 changes from the power saving mode to the normal mode when the human U1 in the detection region R1 is detected based on the output of the human detection sensor 6, thereby preparing for the next use. In this way, the human detection sensor 6 is used for a plurality of functions. Specifically, the human detection sensor 6 for controlling the operation of the image processing portion (for example, the image reading portion 11) is also used in the control of the raising/lowering control portion 23 to lower the sheet placement table 21. With this configuration, there is no need to provide the human detection sensor 6 newly for the control for lowering the sheet placement table 21. This makes it possible to restrict the number of parts from being increased.

In addition, in the present embodiment, the raising/lowering control portion 23 controls the raising/lowering mechanism 4 to raise the sheet placement table 21 when the sheet Sh1 is discharged onto the sheet discharge table 22. That is, during execution of the image processing (here, image reading) on the sheet Sh1, the conveyance mechanism 3 conveys the sheet Sh1 on the sheet placement table 21 to pass the execution position P1, and discharges the sheet Sh1 onto the sheet discharge table 22. Subsequently, during execution of the image processing, the raising/lowering control portion 23 controls the raising/lowering mechanism 4 to raise the sheet placement table 21 when the conveyance mechanism 3 discharges the sheet Sh1 onto the sheet discharge table 22.

Specifically, the raising/lowering control portion 23 keeps the sheet placement table 21, for example, at the initial position (or the lower limit position of the raising/lowering range) in a state where there is no sheet Sh1 on the sheet discharge table 22. Subsequently, when the sheet Sh1 is discharged onto the sheet discharge table 22, the raising/lowering control portion 23 drives the raising/lowering mechanism 4 to raise the sheet placement table 21 so as to increase the gap between the sheet placement table 21 and the sheet discharge table 22. At this time, the raising/lowering control portion 23 may control the raising/lowering mechanism 4 to raise the sheet placement table 21 in correspondence with the number of sheets Sh1 discharged onto the sheet discharge table 22. With this configuration, the space on the sheet discharge table 22 (gap between the sheet discharge table 22 and the sheet placement table 21) becomes variable, making it possible to increase the number of sheets Sh1 that can be set on the sheet placement table 21, while restricting the height of the housing 100 (the sheet placement table 21).

Meanwhile, the raising/lowering control portion 23 is not limited to a configuration where it always lowers the sheet placement table 21 upon detection of the presence of the human U1 by the human detection sensor 6. For example, it is preferable that the raising/lowering control portion 23 lowers the sheet placement table 21 upon detection of the presence of the human U1 by the human detection sensor 6 only when execution of the image processing on all of the predetermined number of sheets Sh1 that are the job target has been completed. Here, the "job target" means a target of an image processing job. In addition, completion of execution of the image processing on all of the predetermined number of sheets Sh1 that are the job target corresponds to the completion of the job (for example, the image reading). In the present embodiment, since the image processing executed on the sheet Sh1 is the image reading performed by the image reading portion 11, the raising/lowering control portion 23 lowers the sheet placement table 21 upon detection of the presence of the human U1 by the human detection sensor 6 on the condition that execution of the image processing on all of the predetermined number of sheets Sh1 that are the job target has been completed. With this configuration, it is possible to inhibit the raising/lowering control portion 23 from lowering the sheet placement table 21 if a human U1 enters the detection region R1 during execution of the job.

The determination on whether or not execution of the image processing on all of the predetermined number of sheets Sh1 that are the job target is completed, may be made based on the operation state of the image processing portion (here, the image reading portion 11), or may be made in other ways. For example, when all sheets Sh1 have gone from on the sheet placement table 21, or when all sheets Sh1 have been discharged onto the sheet discharge table 22, it is determined that execution of the image processing on all of the predetermined number of sheets Sh1 that are the job target is completed.

[3] Sheet Conveying Method

Figure 6:
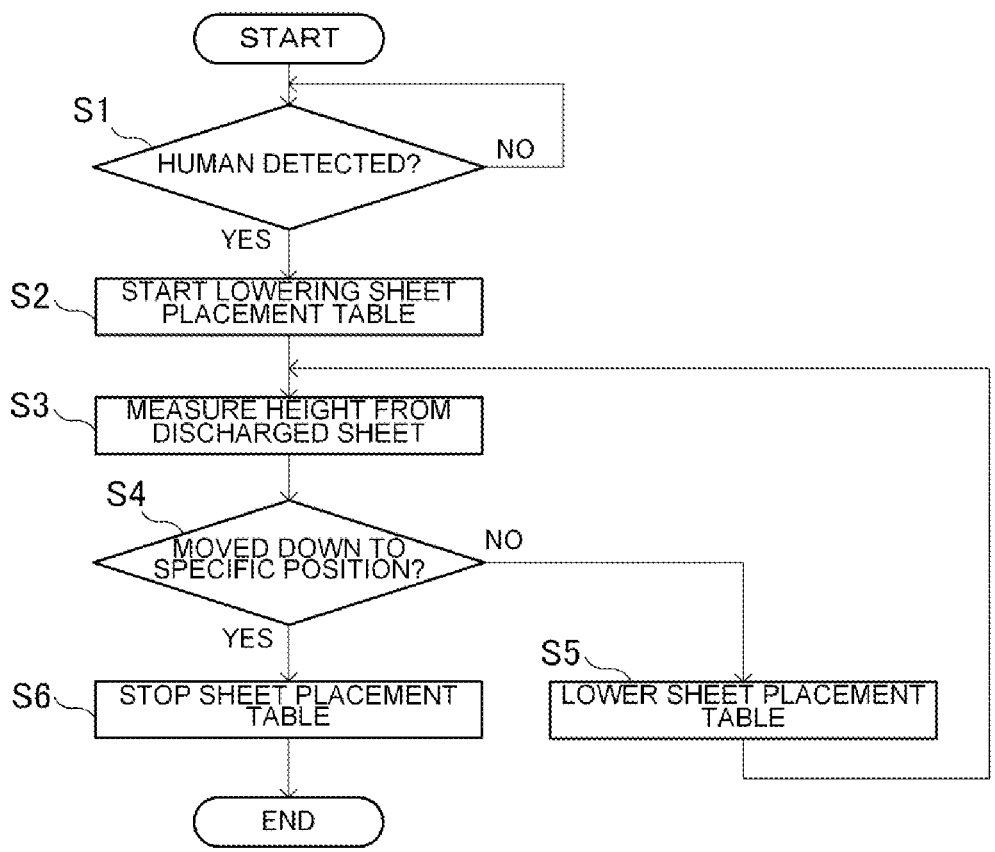
FIG. 6 is a flowchart showing an example of operation of the sheet conveying device according to Embodiment 1.

Next, with reference to FIG. 6, the sheet conveying method according to the present embodiment, namely, an operation of the sheet conveying device 2, is described. Here, steps S1, S2, . . . in the flowchart shown in FIG. 6 represent numbers assigned to the processing procedures (steps) executed by the control portion 15 (mainly the raising/lowering control portion 23). The main configuration of the control portion 15 is a computer system that includes one or more processors and one or more memories. As a result, the following process is realized when the one or more processors execute a conveyance control program.

<Step S1>

First, in step S1, the raising/lowering control portion 23 determines whether or not the presence of the human U1 in the detection region R1 has been detected. That is, when the human detection sensor 6 has output a detection signal indicating that it detected the human U1 in the detection region R1, the raising/lowering control portion 23 determines that the human U1 has been detected (S1: Yes), and moves the process to step S2. On the other hand, when the human detection sensor 6 has not output a detection signal indicating a detection of the human U1 in the detection region R1, the raising/lowering control portion 23 determines that the human U1 has not been detected (S1: No), and repeatedly executes step S1.

<Steps S2>

In step S2, the raising/lowering control portion 23 causes the raising/lowering mechanism 4 to perform the lowering operation to move down (lower) the sheet placement table 21. At this time, the raising/lowering control portion 23 may lower the sheet placement table 21 in a predetermined amount (for example, 1 mm) or continuously. That is, the raising/lowering control portion 23 continues to stop the sheet placement table 21 until the human U1 is detected in step S1, and starts the control to lower the sheet placement table 21 upon detection of the human U1 in step S1.

<Steps S3, S4, S5>

In step S3, the raising/lowering control portion 23 identifies the height H1 that is a height from the sheet Sh1 on the sheet discharge table 22 to the sheet placement table 21, based on an output of the ranging sensor 5. Subsequently, the raising/lowering control portion 23 compares the measured height H1 with the set value. In step S4, the raising/lowering control portion 23 determines whether or not the sheet placement table 21 has moved down to the specific position, depending on whether or not the measured height H1 (measured height) is equal to or lower than the set value. When the measured height completely matches the set value, or when a difference between the measured height and the set value is within an allowable range, the raising/lowering control portion 23 determines that the measured height is equal to or lower than the set value, namely, that the sheet placement table 21 has moved down to the specific position (S4: Yes), and moves the process to step S6. On the other hand, when the difference between the measured height and the set value is not within the allowable range, the raising/lowering control portion 23 determines that the measured height has not reached the set value, namely, that the sheet placement table 21 has not moved down to the specific position (S4: No), and moves the process to step S5.

In step S5, the raising/lowering control portion 23 causes the raising/lowering mechanism 4 to perform the lowering operation to move down (lower) the sheet placement table 21. At this time, the raising/lowering control portion 23 may lower the sheet placement table 21 in a predetermined amount (for example, 1 mm) or continuously. After step S5, the raising/lowering control portion 23 moves the process to step S3. In this way, the raising/lowering control portion 23 continues to control the raising/lowering mechanism 4 to lower the sheet placement table 21 (S5) until the measured height matches the set value, namely, until the sheet placement table 21 reaches the specific position.

<Step S6>

In step S6, the raising/lowering control portion 23 stops the lowering operation of the raising/lowering mechanism 4 to stop the sheet placement table 21, and ends the series of processes. At this time, since the sheet placement table 21 is located at the specific position, the sheet placement table 21 stops at the specific position. In this way, when the sheet placement table 21 has moved down to the specific position, the raising/lowering control portion 23 stops lowering the sheet placement table 21.

The above-described procedure of the sheet conveying method is only an example, and the order of the processes included in the flowchart of FIG. 6 may be appropriately changed, or some processes may be added to the flowchart.

[4] Modification

A plurality of components of the image processing apparatus 10 may be provided dispersedly in a plurality of housings. For example, the raising/lowering control portion 23 that is a component of the sheet conveying device 2 may not necessarily be realized as a function of the control portion 15, but may be provided in a housing that is different from a housing of the control portion 15. That is, the sheet conveying device 2 may not be integrated with the image processing apparatus 10, but at least a part of the sheet conveying device 2 may be provided in a housing that is different from a housing of the image processing apparatus 10.

In addition, the sheet conveyed by the sheet conveying device 2 may be the sheet Sh2 as a target of image forming by the image forming portion 12, namely, a sheet supplied by the sheet feed portion 13. In this case, for example, a manual feed tray of the sheet feed portion 13 corresponds to the sheet placement table of the sheet conveying device 2, and the sheet discharge tray 123 of the image forming portion 12 corresponds to the sheet discharge table of the sheet conveying device 2.

In addition, the size of the sheet Sh1 is not limited to any of regular sizes such as "A3E" or "B4E", but may be other than the regular sizes. In this case, the size of the sheet Sh1 can be defined by, for example, dimensions (lengths) of the sheet Sh1 in the lateral and longitudinal directions. Furthermore, in this case, the raising/lowering control portion 23 may calculate the target position, for example, based on the dimensions of the sheet Sh1 in the lateral and longitudinal directions, not based on the table Ta1.

In addition, it is not indispensable that the raising/lowering control portion 23 identifies the height H1 that is a height from the sheet Sh1 on the sheet discharge table 22 to the sheet placement table 21, based on an output of the ranging sensor 5. For example, the raising/lowering control portion 23 may estimate a total thickness of the sheets Sh1 on the sheet discharge table 22 based on: the number of sheets Sh1 on which the image processing is executed; and the thickness of each sheet Sh1, and may identify the height H1 from the absolute position of the sheet placement table 21 and the total thickness.

In addition, not limited to the configuration where the raising/lowering control portion 23 stops lowering the sheet placement table 21 when the sheet placement table 21 moves down to the specific position, the raising/lowering control portion 23 may stop lowering the sheet placement table 21 after continuing to lower the sheet placement table 21 for a predetermined time period. In addition, not limited to the configuration where the specific position is defined by the height H1 that is a height from the sheet Sh1 on the sheet discharge table 22 to the sheet placement table 21, the specific position may be defined by the absolute position (height) of the sheet placement table 21. In addition, not limited to the configuration where the output of the human detection sensor 6 is used to control the operation of the image processing portion, the output of the human detection sensor 6 may be used only for the control of the raising/lowering control portion 23 to lower the sheet placement table 21. Furthermore, the raising/lowering control portion 23 is not limited to the configuration where it controls the raising/lowering mechanism 4 to raise the sheet placement table 21 when the sheet Sh1 is discharged onto the sheet discharge table 22.

Embodiment 2

The image processing apparatus 10 according to the present embodiment differs from the image processing apparatus 10 according to Embodiment 1 in the configuration of the human detection sensor 6. In the following description, the same components as those in Embodiment 1 are assigned the same reference signs, and description thereof is omitted as necessary.

In the present embodiment, the human detection sensor 6 is provided independent of the housing 100 of the image processing apparatus 10. For example, the human detection sensor 6 includes an image sensor that has, as its imaging range, the detection region R1 that extends in front of the housing 100 of the image processing apparatus 10, and detects the human U1 in the detection region R1 from an image of the detection region R1. The raising/lowering control portion 23 acquires an output from such an external human detection sensor 6 via the communication portion. The raising/lowering control portion 23 controls the raising/lowering mechanism 4 to lower the sheet placement table 21 when the human detection sensor 6 has detected the presence of the human U1 in the detection region R1.

In a modification of the present embodiment, the human detection sensor 6 that is provided independent of the housing 100 of the image processing apparatus 10, may include a pyroelectric infrared sensor or the like. The configuration (including the modification) of Embodiment 2 is applicable in combination with the configuration (including the modification) of Embodiment 1.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A sheet conveying device comprising:
    a sheet placement table;
    a sheet discharge table located below the sheet placement table;
    a conveyance mechanism configured to convey a sheet placed on the sheet placement table onto the sheet discharge table via an execution position at which image processing is executed by an image processing portion;
    a raising/lowering mechanism configured to raise and lower the sheet placement table; and
    a raising/lowering control portion configured to control the raising/lowering mechanism to lower the sheet placement table when a human detection sensor configured to detect a human in a detection region has detected the human in the detection region.

2. The sheet conveying device according to claim 1, wherein
    when the sheet placement table moves down to a specific position, the raising/lowering control portion stops lowering the sheet placement table.

3. The sheet conveying device according to claim 2, wherein
    the specific position is a position where a height from the sheet on the sheet discharge table to the sheet placement table is equal to or lower than a set value.

4. The sheet conveying device according to claim 1, wherein
    an output of the human detection sensor is used to control operation of the image processing portion.

5. The sheet conveying device according to claim 1, wherein
    the raising/lowering control portion controls the raising/lowering mechanism to raise the sheet placement table when the sheet is discharged onto the sheet discharge table.

6. An image processing apparatus comprising:
    the sheet conveying device according to claim 1; and
    the image processing portion configured to execute at least one of image reading and image forming on the sheet as a target.

7. A sheet conveying method used in a sheet conveying device that includes:
    a sheet placement table;
    a sheet discharge table located below the sheet placement table;
    a conveyance mechanism configured to convey a sheet placed on the sheet placement table onto the sheet discharge table via an execution position at which image processing is executed by an image processing portion; and
    a raising/lowering mechanism configured to raise and lower the sheet placement table,
    the sheet conveying method comprising
        controlling the raising/lowering mechanism to lower the sheet placement table when a human detection sensor configured to detect a human in a detection region has detected the human in the detection region.

8. The sheet conveying device according to claim 1, wherein the human detection sensor is disposed on the sheet conveying device and configured to capture detection signals indicating the human present in the detection region adjacent to the sheet conveying device.

9. The sheet conveying device according to claim 8, wherein the human detection sensor is an image sensor configured to capture an image indicating the human present in the detection region adjacent to the sheet conveying device.

10. The sheet conveying device according to claim 8, wherein the human detection sensor is an infrared sensor configured to capture an infrared image indicating the human present in the detection region adjacent to the sheet conveying device.

11. The sheet conveying method according to claim 7, wherein the sheet placement table is lowered when the human detection sensor disposed on the sheet conveying device captures detection signals indicating the human present in the detection region adjacent to the sheet conveying device.

12. The sheet conveying method according to claim 11, wherein the sheet placement table is lowered when the human detection sensor configured as an image sensor captures an image indicating the human present in the detection region adjacent to the sheet conveying device.

13. The sheet conveying method according to claim 11, wherein the sheet placement table is lowered when the human detection sensor configured as an infrared sensor captures an infrared image indicating the human present in the detection region adjacent to the sheet conveying device.

* * * * *